United States Patent [19]

Spirig

[11] 4,164,606
[45] Aug. 14, 1979

[54] TINNED COPPER BRAIDS FOR SOLDER REMOVING

[76] Inventor: Ernst Spirig, Movenstrasse 37, CH-8640, Rapperswil, Switzerland

[21] Appl. No.: 849,616

[22] Filed: Nov. 8, 1977

[51] Int. Cl.$^2$ .............................................. B23K 1/00
[52] U.S. Cl. .................................. 428/605; 228/264; 228/19; 29/460; 428/566
[58] Field of Search ........................ 228/19, 254, 264; 29/460; 428/566, 605, 644

[56] References Cited

U.S. PATENT DOCUMENTS

| | | | |
|---|---|---|---|
| 1,731,218 | 10/1929 | Adams | 428/605 |
| 2,332,726 | 10/1943 | Joyce, Jr. | 228/254 |
| 3,627,191 | 12/1971 | Hood, Jr. | 228/19 |
| 3,715,797 | 2/1973 | Jackson et al. | 228/19 X |
| 3,753,278 | 8/1973 | Hamaguchi et al. | 428/644 X |

OTHER PUBLICATIONS

*Soldering Manual* American Welding Society, 1954, pp. 57–58.
R. Poliak and L. Rausch "Solder Wick" *IBM Technical Disclosure Bulletin,* vol. 13, No. 2, Jul. 1970, p. 445.
*Solok Lead Frame Terminals* DuPont Electric Products Publication A-78361, Nov. 1971.

*Primary Examiner*—C. W. Lanham
*Assistant Examiner*—K. J. Ramsey
*Attorney, Agent, or Firm*—Cushman, Darby & Cushman

[57] ABSTRACT

A device for removing a solder alloy from a solid soldered joint comprising a multiplicity of metallic strands formed into an elongated wick operable to effect the solder removal through the application of an end portion thereof to the joint in heat exchange relation to a heat source so that when the solder alloy is rendered molten by the heat source it will flow by capillary action from the joint into the applied end portion of the wick, the improved step of each metallic strand of the wick having its exterior surface coated with solidified solder alloy having a melting point substantially below the melting point of tin prior to being formed into the wick so that when the end portion thereof is applied to the joint in heat exchange relation with the heat source as aforesaid the solid solder alloy of the coating on the strands of the applied end portion when rendered molten by the heat source mixes with the molten solder alloy from the joint flowing by capillary action into the applied end portion of the wick, and an improved wick formed by the method.

12 Claims, 4 Drawing Figures

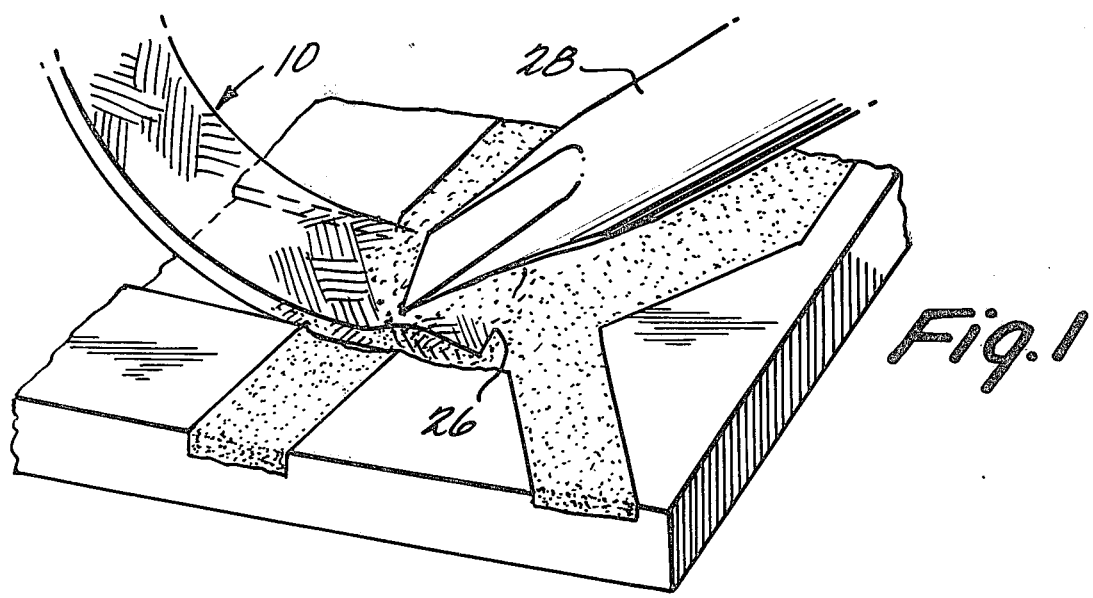
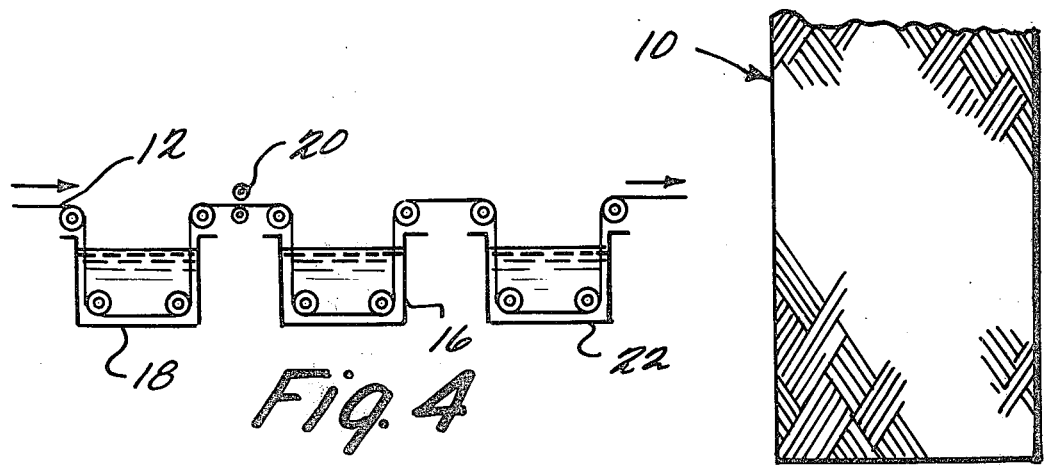
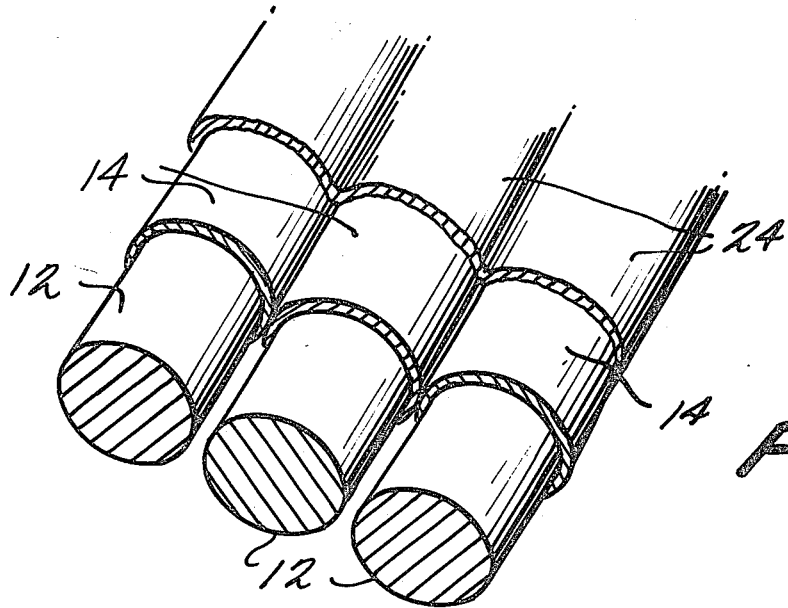

TINNED COPPER BRAIDS FOR SOLDER REMOVING

This invention relates to the art of removing solder from solid soldered joints and more particularly to an improved solder removing device in the form of a wick, and method of making the same.

Solder removing devices in the form of an elongated wick which is operable to effect solder removal through the application of an end portion of the wick to the joint in heat exchange relation to a heat source, such as a soldering iron or the like, so that when the solder of the joint is rendered molten by the heat source the solder will flow by capillary action from the joint into the applied end of the wick, are well known. The state of the prior art is exemplified in U.S. Pat. Nos. 3,627,191 and 3,715,797. These two patents illustrate the two basic types of solder removing wicks currently available on the commercial market.

The wick disclosed in U.S. Pat. No. 3,627,191 is braided from a multiplicity of strands of bare copper wire. After the braiding operation has been performed, the wick is then coated with a solder flux, preferably a non-corrosive flux, such as rosin. The flux coating serves two basic functions. First, it serves as a protective coating for the exterior surface of the copper strands of the wick, preventing further oxidation thereof such as would occur when bare copper surfaces are subjected to atmospheric conditions for an extended period of time. The flux also serves the conventional fluxing function when the wick is used.

The wick construction disclosed in U.S. Pat. No. 3,715,797 is likewise braided of a multiplicity of strands, however, prior to the braiding operation the metal strands, which may be initially copper, are coated with tin, as by a tin plating operation. Here again, after the braiding operation has been accomplished the braided wick is coated with a solder flux as, for example, rosin.

A preferred procedure for effecting the coating of the flux on the wick is disclosed in my copending U.S. patent application Ser. No. 681,843, filed Apr. 30, 1976, now U.S. Pat. No. 4,081,575. For purposes of background the disclosures of the above two patents, as well as the above-mentioned patent application, are hereby incorporated by reference into the present specification. While the de-soldering wicks described above have proven satisfactory in operation, there is always a need to improve performance and to make a soldering wick which will work better, quicker and more reliably than the wicks heretofore known.

Accordingly, it is an object of the present invention to fulfill the aforesaid need for an improved wick. In accordance with the principles of the present invention, this objective is obtained by the improved procedure of providing a solder coating on each of the metal strands used in the formation of the de-soldering wick prior to the formation of such wick. An improved wick construction embodying this improved structure and procedure functions in a manner quite different from prior art de-soldering wicks formed of bare copper strands or copper strands plated with tin. The coating of the copper strands with solder prior to the formation of the wick in accordance with the principles of the present invention cannot properly be analogized to the prior art structure and procedure of tin plating the copper strands prior to the formation of the wick since a fundamentally different operational function takes place in use. Tin plating has a relatively high melting point (450° F.) and consequently, when tin plated copper strands are used to form the wick, its intended function is to remain solid and present non-corrosive solid exterior surfaces to which the solder of the joint will be attracted in the presence of the flux. In contradistinction to this function, the solder coating on the strands of the wick of the present invention has as its intended function to change from a solid phase to a liquid phase in the presence of the heat source during use.

The de-soldering effectiveness of tin plated (or bare copper) strands is dependent upon an intermetal soldering or adhering action taking place between two different metals in the presence of a flux within the interstices or capillary spaces provided by the solid surfaces of tin plating. By following the principles of the present invention the intermetal soldering or adhering action between the exterior surface of the solid strands of the wick is performed during the solder coating procedure prior to the formation of the wick under conditions which can be controlled and made most advantageous as compared with the field conditions which sometimes must be encountered in the de-soldering operation. By following the principles of the present invention, de-soldering effectiveness is no longer dependent upon a soldering action between two different metals in different phase conditions, but instead the more readily effected intermixing of two essentially identical solder alloys, both in the same molten phase condition. Moreover, the de-soldering effectiveness is not limited by a fixed capillary space volume per unit length of wick, as is the case with tin plated (or bare copper) strand wicks, but rather the capillary space volume originally defined by the exterior surfaces of the solder coating is subject to being increased in operation near the wick end, due to the displacement of solder coating up the wick end portion.

These and other objects of the present invention will become more apparent during the course of the following detailed description and appended claims.

The invention may best be understood with reference to the accompanying drawings, wherein an illustrative embodiment is shown.

In the drawings:

FIG. 1 is a perspective view illustrating the wick embodying the principles of the present invention in use in removing solder from a solid soldered joint;

FIG. 2 is an enlarged plan view of an end portion of the wick shown in FIG. 1;

FIG. 3 is an enlarged perspective view showing the end portion of a plurality of strands used in the wick shown in FIG. 2; and FIG. 4 is a schematic view illustrating the procedures utilized in effecting the coating of the strands with solder alloy, in accordance with the principles of the present invention.

In the drawings there is shown a device in the form of an elongated wick, generally indicated at 10, which embodies the principles of the present invention. The wick 10 is formed on a conventional braiding machine from a multiplicity of metallic strands 12 by simply braiding the strands in the machine. The actual braiding of the strands is of a conventional nature. The number of strands utilized in the braid likewise can be of a conventional nature. In this regard, reference may be had to the aforesaid patent disclosures incorporated by reference.

The present invention is more particularly concerned with improved procedures performed with respect to the strands prior to the formation of the strands into a wick in the braiding machine, and to the resultant improved construction embodied in the wick so formed. The method of the present invention preferably involves the coating of the metallic strands. A preferred metallic strand is copper and a preferred size is 0.08 mm diameter. The number of strands utilized in the braid may be of any conventional number, such as 64, 96 or 120.

In accordance with the principles of the present invention, the strands which are braided together to form the elongated wick are coated with a solder alloy coating, generally indicated at 14 in FIG. 3. The solder alloy utilized in the coating has a melting point substantially below the melting point of tin, as for example, below 440° F. Preferably, the melting point is below 400° F. with a preferred melting point of 370° F., which is the melting point of the preferred solder alloy which consists of 60% tin and 40% lead. It will be understood that pure eutectic solder alloy consisting of 63% tin and 37% lead, having a melting point of 361° F., may also be used to good advantage, as can the so-called superalloys (see, for example, Howard H. Manko "Solders and Soldering", 1964, page 93), having a melting point below the eutectic melting temperature of solder alloys of the tin-lead composition. Such solder alloys may include small percentages of other metals, such as bismuth and the like.

In accordance with the principles of the present invention, the coating 14 is preferably applied by maintaining a bath of molten solder alloy at a temperature of approximately 400° F. to 550° F. as indicated at 16 in FIG. 4. The strands are simply passed through the bath by continuously moving the same into and out of the bath. It is preferable, in accordance with the principles of the present invention, to pass the strands through an initial bath 18 consisting of an aqueous solution of an organic flux, as, for example No. 30 flux manufactured by Superior Flux and Manufacturing Company, Cleveland, Ohio, the aqueous solution consisting of 1 part water and 2 parts flux. Where the tarnished condition of the exterior surfaces of the copper strands is excessive, it may be necessary to utilize an inorganic flux in lieu of the organic flux. A suitable inorganic flux is zinc-chloride or No. 22 flux, manufactured by Superior. Here again the strands are simply moved longitudinally and passed downwardly to the bath and then upwardly out of the bath. Between the flux bath 18 and the molten solder bath 16 the strands are wiped off by a sponge wiper 20 to remove excess flux. Preferably, after passage through the molten solder bath 16, the coated strands are finally passed through a rinse water bath 22 which is maintained at a temperature of approximately 140° F. The rinse water bath serves to rinse away any traces of water soluble flux residue.

The speed of movement of the strands 12 through the baths 16, 18 and 22, will depend upon the nature of the flux utilized in the bath 18. An exemplary speed is 1 meter per second. The thickness of the coating applied can be varied by varying the speed, but desirably a most rapid speed consistent with yielding a smooth coating is preferred. An exemplary coating thickness is 0.002 to 0.01 mm.

After the strands 12 have been coated with 60-40 solder alloy coating 14, as indicated above, they are then fed to the braiding machine where they are braided and then flattened into an elongated wick formation. After the formation of the elongated flattened braid, the wick is then coated with a non-corrosive flux 24, i.e., rosin, and dried, preferably in accordance with the teachings of my aforesaid patent application.

With reference to FIG. 1, it can be seen that when an end portion of the wick 10 is applied to a solid soldered joint, such as the joint 26 illustrated in FIG. 1, and a source of heat such as a soldering iron tip 28 as shown in FIG. 1 is brought into heat exchange relation with respect to the wick end portion and the solid solder of the joint, the solid solder of the joint will be heated to its melting point and at the same time the solder coating 14 of the wick will likewise become molten. The molten solder is attracted through capillary action to the interstices of the wick. It will be noted that the molten solder from the joint which, as shown, has the standard 60-40 formulation, is the same as the solder alloy formulation of the coating 14. Consequently, the movement of the molten solder from the joint by capillary action does not require that an intermetal soldering action take place between two dissimilar metal alloys in different phases, but rather, a simple intermixing of identical metal alloys or substantially the same metal alloys both in the same molten phase. The intermetal action between the solder coating 14 and the exterior surface of the copper strands or wires 12 is accomplished in accordance with the principles of the present invention prior to the formation of the strands into the wick. Consequently, since this intermetal action has already been accomplished with the present construction, there is no need to effect the same during the wicking procedure. All that is required is the much simpler and more rapid intermixing of two substantially identical molten metal alloys. Moreover, since the coating 14 at the end of the wick which is applied to the joint becomes molten, it will move microscopically to the crossings of the strands thinning the liquid coating on the strand between these crossings where the strands touch each other. In this way the wick constructed in accordance with the principles of the present invention achieves a more rapid and positive sucking action on the molten solder of the joint than heretofore.

Another advantage of the present construction as compared with the tin plated strand construction of the prior art is that after de-soldering has taken place a much more visible used portion of the wick is apparent with the present construction than with the conventional tin plated construction. With the wick of the present construction, the solder alloy coating will melt in the end portion which is applied to the connection and by virtue of such melting will exhibit a different visual characteristic after cooling than the portion of the wick where the coating did not melt. This visual characteristic when taken with the visual characteristic relating to the filling of the interstices results in a much more easily recognized used end portion than is the case with tin plated wicks. Thus, while the present construction does not provide as clear-cut visibility to the user of the used end portion of the wick after de-soldering as is the case with pure copper wicks, the visibility is better than tin plated wicks, for the reasons indicated above.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

I claim:

1. A device for removing a solder alloy from a solid soldered joint comprising a multiplicity of metallic strands formed into an elongated wick operable to effect said solder removal through the application of an end portion thereof to the joint in heat exchange relation to a heat source so that when the solder alloy is rendered molten by the heat source it will flow by capillary action from the joint into the applied end portion of the wick, the improvement which comprises each metallic strand of said wick having its exterior surface coated with solidified solder alloy having a melting point substantially below the melting point of tin prior to being formed into said wick so that when the end portion thereof is applied to said joint in heat exchange relation with the heat source as aforesaid the solid solder alloy of the coating on the strands of the applied end portion when rendered molten by the heat source mixes with the molten solder alloy from the joint flowing by capillary action into the applied end portion of the wick.

2. The improvement as defined in claim 1 wherein said solidified solder alloy coating has a melting point below 400° F.

3. The improvement as defined in claim 1 wherein said solidified solder alloy coating has a melting point below 370° F.

4. The improvement as defined in claim 1 wherein said solder alloy coating is a solder alloy of approximately 60% tin and 40% lead.

5. A method of forming a multiplicity of metal strands into an elongated wick capable of removing solder alloy from a solid soldered joint through the application of an end portion of the wick to the joint in heat exchange relation to a heat source so that when the solder alloy is rendered molten by the heat source it will flow by capillary action from the joint into the applied end portion of the wick, the improvement which comprises the step of coating the metallic strands of said wick with solidified solder alloy having a melting point substantially below the melting point of tin prior to the formation of said metallic strands into said wick so that when the end portion thereof is applied to the joint in heat exchange relation with the heat source as aforesaid the solid solder alloy of the coating on the strands of the applied end portion when rendered molten by the heat source mixes with the molten solder alloy from the joint flowing by capillary action into the applied end portion of the wick.

6. The improvement as defined in claim 5 wherein said solidified solder alloy is coated on the metallic strands of said wick by passing the strands through a molten bath of solder alloy.

7. The improvement as defined in claim 6 wherein said strands are passed through a bath of aqueous solution of an organic flux prior to being passed through said molten bath of solder alloy.

8. The improvement as defined in claim 7 wherein said strands are passed through a rinse water bath subsequent to their passage through the molten bath of solder alloy.

9. The improvement as defined in claim 6 wherein said molten bath of solder alloy is maintained at a temperature approximately 400° F.

10. The improvement as defined in claim 5 wherein said strands are formed into said wick by braiding and said wick is coated with a non-corrosive flux after being braided.

11. The improvement as defined in claim 1 wherein said elongated wick after formation from said multiplicity of metallic strands is coated with a non-corrosive flux.

12. The improvement as defined in claim 11 wherein said metallic strands are copper and said flux is rosin.

* * * * *